United States Patent
Bowles et al.

(10) Patent No.: US 7,823,674 B2
(45) Date of Patent: Nov. 2, 2010

(54) MOTORIZED VEHICLE CONFIGURED TO ACCOMMODATE HANDICAPPED INDIVIDUALS

(76) Inventors: Dean Bowles, 131 Indian Lake Blvd., Hendersonville, TN (US) 37075; Tommy Koen, 131 Indian Lake Blvd., Hendersonville, TN (US) 37075

( * ) Notice: Subject to any disclaimer, the term of this patent is extended or adjusted under 35 U.S.C. 154(b) by 201 days.

(21) Appl. No.: 12/105,340

(22) Filed: Apr. 18, 2008

(65) Prior Publication Data

US 2008/0283320 A1 Nov. 20, 2008

Related U.S. Application Data

(60) Provisional application No. 60/907,797, filed on Apr. 18, 2007.

(51) Int. Cl.
*B62D 61/06* (2006.01)
*B62D 61/08* (2006.01)

(52) U.S. Cl. ........................... 180/210; 180/215

(58) Field of Classification Search .......... 180/11, 180/12, 15, 16, 21, 198, 209, 210, 215; 280/62, 280/304.1; 414/354, 467, 469, 474, 475, 414/476, 607, 678, 679, 921

See application file for complete search history.

(56) References Cited

U.S. PATENT DOCUMENTS

| | | | | |
|---|---|---|---|---|
| 1,105,731 A | * | 8/1914 | Wells | 280/204 |
| 3,204,791 A | * | 9/1965 | Williams | 414/537 |
| 3,912,032 A | * | 10/1975 | Benz et al. | 180/13 |
| 3,913,759 A | * | 10/1975 | Deacon | 414/546 |
| 3,921,740 A | * | 11/1975 | Forster | 180/213 |
| 4,003,443 A | * | 1/1977 | Boughers | 180/217 |
| 4,221,276 A | | 9/1980 | Mitchell et al. | |
| 4,324,309 A | | 4/1982 | Ginley | |
| 4,415,056 A | | 11/1983 | Smith | |
| 4,461,609 A | | 7/1984 | Zinno | |
| 4,518,057 A | * | 5/1985 | McCallum | 180/210 |
| 4,576,539 A | * | 3/1986 | Williams | 187/200 |
| 4,580,652 A | | 4/1986 | Turner et al. | |
| 4,671,730 A | * | 6/1987 | Gateau | 414/495 |
| 4,887,829 A | * | 12/1989 | Prince | 280/282 |
| 4,898,508 A | * | 2/1990 | Hayata | 414/476 |
| 4,961,477 A | | 10/1990 | Sweeney | |
| 5,066,032 A | * | 11/1991 | Van Vooren et al. | 280/304.1 |
| 5,094,314 A | * | 3/1992 | Hayata | 180/217 |
| 5,305,845 A | * | 4/1994 | Van Dooren | 180/65.1 |

(Continued)

FOREIGN PATENT DOCUMENTS

JP 1-311966 * 12/1989

(Continued)

*Primary Examiner*—Ruth Ilan
*Assistant Examiner*—Joseph Rocca
(74) *Attorney, Agent, or Firm*—Muncy, Geissler, Olds & Lowe, PLLC (57) ABSTRACT

A motorized vehicle, such as a trike motorcycle, includes a frame having a front end connected to at least one front wheel and having a rear end, first and second spaced swing arm assemblies mounted at the rear end, first and second rear wheel assemblies supported by the first and second swing arm assemblies and defining a space therebetween, and at least one support extending from the frame into the space. The arrangement allows a modular structure such as a wheelchair to be connected to the at least one support.

14 Claims, 11 Drawing Sheets

U.S. PATENT DOCUMENTS

| | | | |
|---|---|---|---|
| 6,019,567 A * | 2/2000 | Lutkus et al. | 414/549 |
| 6,517,443 B1 * | 2/2003 | Villella | 472/95 |
| 6,551,050 B1 * | 4/2003 | Kallevig et al. | 414/607 |
| 7,117,967 B2 * | 10/2006 | Kidd et al. | 180/209 |
| 7,419,024 B1 * | 9/2008 | Tavantzis | 180/210 |
| 7,647,999 B2 * | 1/2010 | Geiser | 180/210 |
| 2005/0167961 A1 | 8/2005 | Murata et al. | |

FOREIGN PATENT DOCUMENTS

| | | | |
|---|---|---|---|
| WO | WO 9210422 A1 * | 6/1992 | |
| WO | WO 2005/077683 A1 * | 8/2005 | |

* cited by examiner

MOTORIZED VEHICLE CONFIGURED TO ACCOMMODATE HANDICAPPED INDIVIDUALS

CROSS-REFERENCE TO RELATED APPLICATIONS

This application claims the benefit of U.S. Provisional Application Ser. No. 60/907,797 to Dean Bowles, et al., filed Apr. 18, 2007, in the United States Patent & Trademark Office, the disclosure of which is incorporated herein in its entirety by reference.

BACKGROUND

1. Field of the Invention

The present invention is directed to a motorized vehicle configured to removably support a modular structure such as a wheelchair, and more specifically, toward a motorized vehicle such as a motorized tricycle having spaced rear swing arms creating a space between the rear wheels of the vehicle and including at least one support between the rear wheels on which a modular structure such as a wheelchair can be mounted.

2. Description of Related Art

It is often difficult for a handicapped person, especially a person confined to a wheelchair, to ride a motorcycle or motorized tricycle as a driver or passenger. Previous attempts to modify motorcycles for handicap access in some cases required a handicapped individual to lift himself out of his wheelchair into a sidecar or onto a platform next to the motorcycle. Other motorcycles had platforms for supporting a wheelchair but required someone in addition to the wheelchair user to help to roll or lift the wheelchair onto the platform. After the individual was seated on another seat or in the sidecar, the wheelchair had to be separately stowed or otherwise attached to the motorcycle. This could prove uncomfortable for the handicapped rider who could not fully enjoy a true rider experience. It would therefore be desirable to provide a motorized vehicle that can be ridden by a person in a wheelchair.

SUMMARY OF THE INVENTION

These and other problems are addressed by embodiments of the present invention, a first aspect of which comprises a motorized vehicle that includes a frame having a front end connected to at least one front wheel and having a rear end. The vehicle also includes first and second spaced swing arm assemblies mounted at the rear end and first and second rear wheel assemblies supported by the first and second swing arm assemblies and defining a space therebetween. At least one support extends from the frame into the space.

Another aspect of the invention comprises a three-wheeled motorcycle that includes a frame having a front end and a rear end and first and second spaced swing arms at the rear end. First and second rear wheel assemblies are mounted on the first and second swing arms and at least one support extends from the frame into a space between the first and second rear wheel assemblies. A wheelchair is releasably mounted on the at least one support.

Yet another aspect of the invention comprises a frame for a wheeled vehicle that includes a front end having a portion adapted to connect to at least one front wheel, a rear end, first and second spaced swing arm assemblies mounted at the rear end and defining a space therebetween and adapted to support first and second wheel assemblies, and at least one support extending from the frame into the space.

BRIEF DESCRIPTION OF THE DRAWINGS

These and other aspects of embodiments of the invention will be better understood after a reading of the detailed description taken in connection with the attached drawings wherein.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention may not be described in detail or may have been omitted so as not to obscure the relevant details of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. The terms "comprises", "comprising", "includes" and/or "including", when used herein, specify the presence of stated features, steps, operations, elements, and/or components, but do not preclude the presence or addition of one or more other features, steps, operations, elements, components, and/or groups thereof.

While a three-wheeled vehicle design is shown in many of the depicted embodiments, many features of the present application may be applied to a traditional two-wheeled motorcycle, or a four-wheeled vehicle ("a quad") as well.

A feature present in one or more of the embodiments of the present invention is directed at a vehicle design that appears, e.g., has the look and feel for both the observer and the rider, of a similar vehicle which does not integrate handicap features. Alternatively or in addition to being configured to carry a wheelchair, the vehicle may also integrate other modular structures, such as a wheeled cargo or luggage rack which may optionally include a seat, such as for a primary or secondary driver of the vehicle.

As described hereafter, while the wheels of the wheelchair may be visible from the rear side of the vehicle, the vehicle may be designed to integrate a wheelchair that is not visible from the left and right sides of the vehicle by an observer, e.g., the main rear wheels of the vehicle obstruct any view of the wheelchair wheels, and/or a tailgate (not shown) may also obstruct the rear wheels of the wheelchair from the back of the vehicle. The system for raising and lowering the swing arm frame assembly may include, in one example, a pneumatic system, e.g., with one or more pistons and one or more air compressors and associated tubing and controls. Other pressurized fluid systems such as hydraulic and/or electromechanical systems for raising and lowering the frame for connection to an integral wheelchair and/or a cargo carrying module are also contemplated herein.

Figure 1:
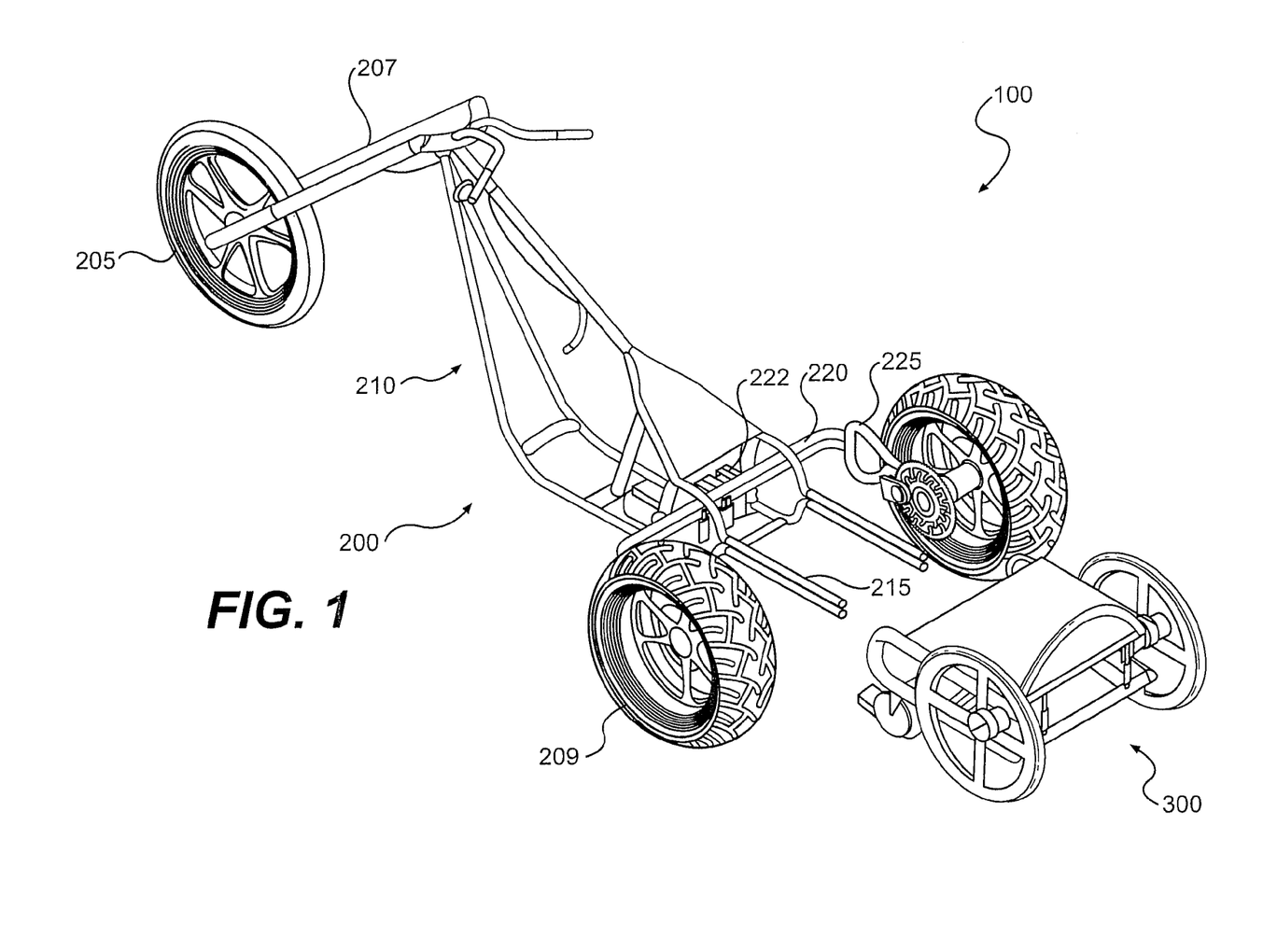
FIG. 1 is a top perspective view of a three-wheeled vehicle and a wheelchair in accordance with embodiment of the present invention.
Figure 13:
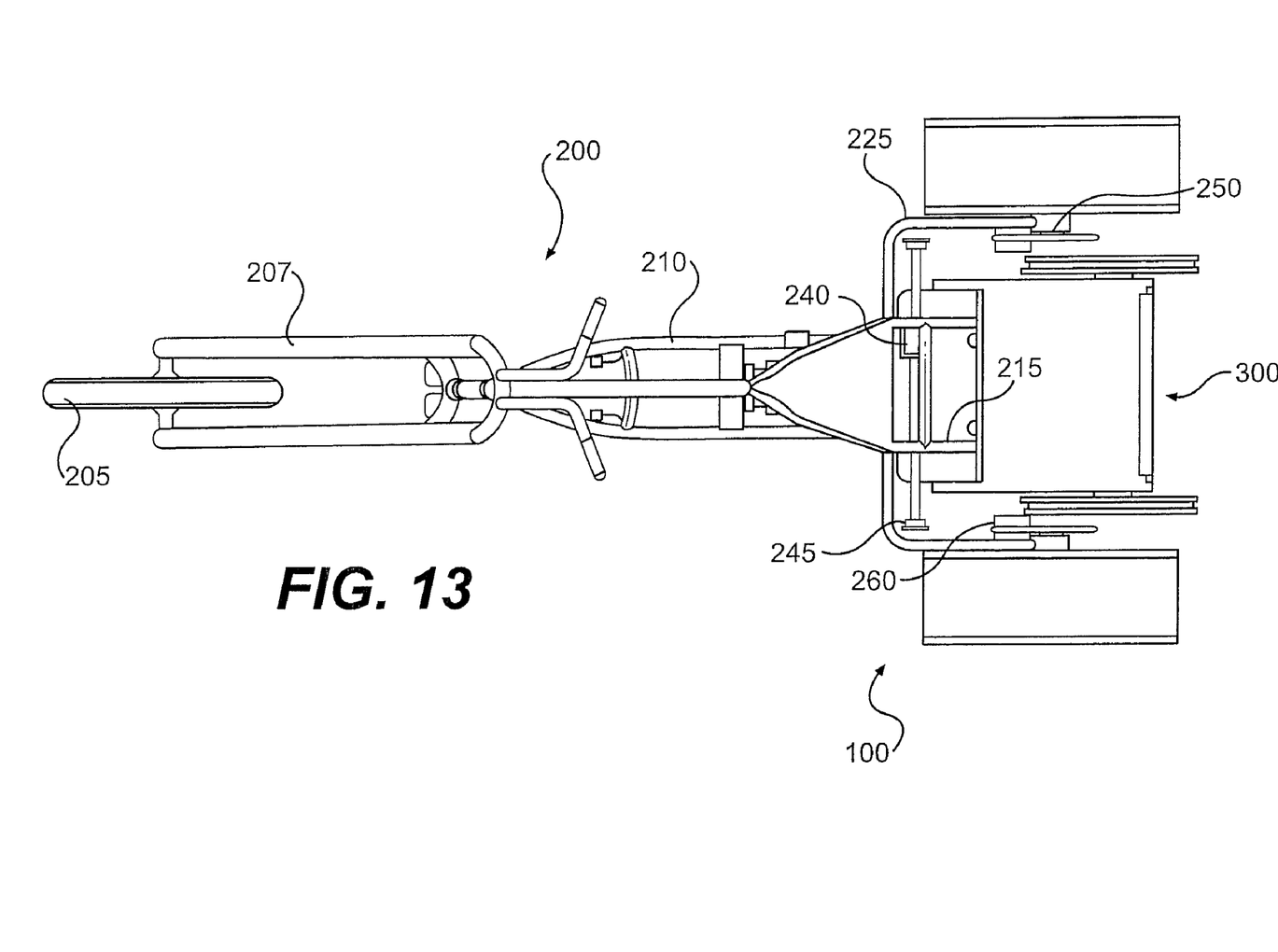
FIG. 13 is a top view of the vehicle of FIG. 1 with the wheelchair installed thereon.

Referring to FIGS. 1 and 13, there is shown a combination 100 comprising a wheeled vehicle 200 (hereafter described in the examples as a "trike 200") and a modular structure (hereafter "wheelchair 300"). FIG. 1 illustrates an uncoupled relationship and FIG. 13 shows the trike 200 and wheelchair 300 connected to each other to form combination 100.

Trike 200 includes a front wheel 205 connected to a frame body 210 via fork 207. For purposes of clarity so as to not obscure the relevant details of the invention, the engine, gas tank, transmission with accompanying chains and seat have been omitted. A swing arm assembly 220 is provided near the rear end of frame 210. The swing arm assembly 220 comprises a pair of swing arms 225 connected by a central brace 222 to a dual piston system 230. As will be described hereafter, the adjustable dual piston system 230 works with the swing arm assembly 220 to lower the rear of frame 210 to make it easier for wheelchair 300 to connect to the frame. Each swing arm 225 is connected at a distal end to a corresponding wheel axle 246.

The rear of frame 210 includes first and second mounting arms 215. As will be described in further detail, the arms 215 are received within openings in the wheelchair 300 to connect wheelchair 300 to the frame 210. FIG. 13 additionally illustrates a transverse shaft 240 that powers a chain drive 250 (the wheel chains have been removed between the shaft sprocket 245 and wheel sprocket 255 for clarity). The orientation of the transverse shaft 240 and chain drive 250, which provide for a reverse differential, coupled with the swing arm assembly 220 enables the trike 200 to have an open rear end, as shown in FIGS. 1 and 13. As is well known in the motorcycle arts, suitable drive belts could be used in place of drive chains where desired.

Figure 2:
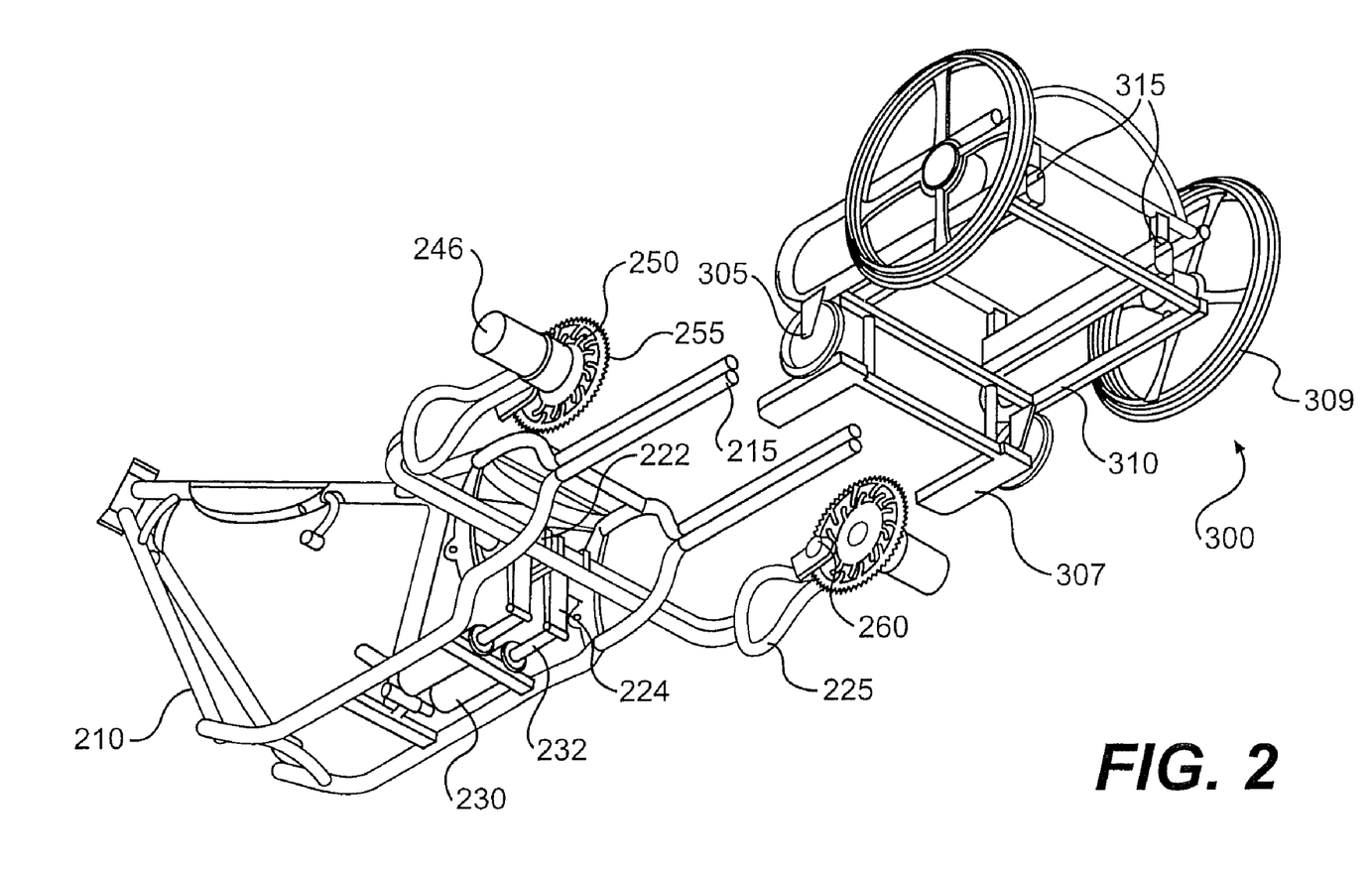
FIG. 2 is a bottom perspective view of the vehicle and wheelchair of FIG. 1 with the vehicle wheels removed for illustration purposes.

FIG. 2 is a bottom view of the vehicle frame, dual piston system, swing arm assembly and mounting assembly of the vehicle for mounting the wheelchair, in accordance with the example embodiments. In FIG. 2, the shaft drive 240 is removed so as to more clearly see connections between the dual piston system 230 and swing arm assembly.

The rear of frame 210 can be raised and lowered via the adjustable dual piston system 230. The adjustable dual piston system 230 is attached to the swing arm assembly 220. Specifically the piston pistons 232 are connected to a pair of bracket arms 224 that in turn are connected to the central brace 222 of the swing arm assembly 220. In one example, the pistons in the dual piston system 230 may be air (pneumatic) pistons driven by an onboard air compressor. Alternatively, the dual piston system 230 can be driven by a hydraulic fluid or pressurized fluid system.

By extending the pistons 232 of the piston system 230, central brace 222 rotates and pivots the swing arm assembly 220 upward, which cants the frame 210 toward the ground so that the arms 215 are lowered to the level of wheelchair mounting rails 315. The rider then wheels the wheelchair 300 forward along the arms 215 until the wheelchair can not move further. Suitable locking means (not shown) such as a locking pin, cotter pin or fastener may be used to lock the arms 215 and mounting rails 315 together. This secures the wheelchair 300 in place on frame 210. By retracting the pistons 232 after the rider is secured thereon, the frame 210 is lifted to a normal riding level and the wheelchair is lifted off the ground.

Figure 3:
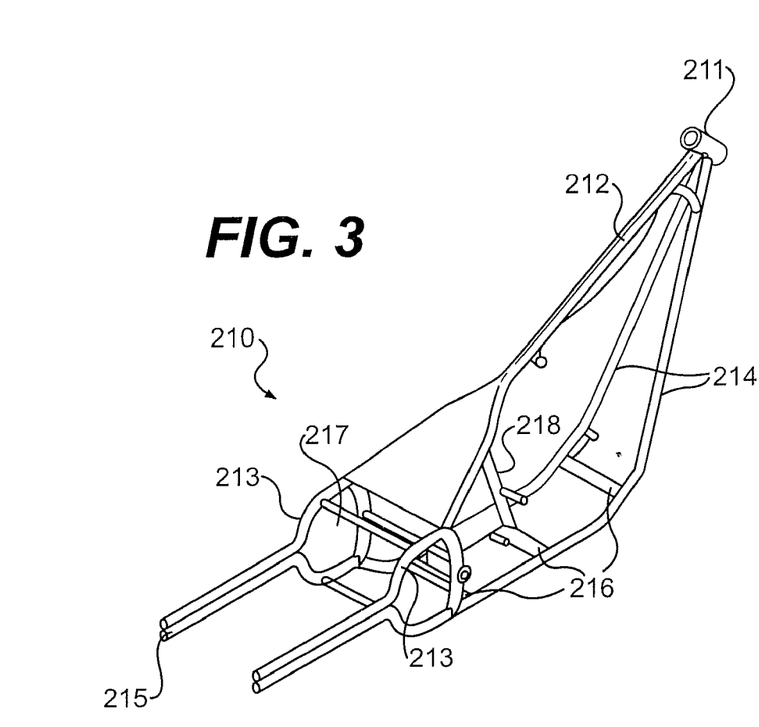
FIG. 3 is perspective view of the frame of the vehicle of FIG. 1.

FIG. 3 is perspective view of the vehicle frame to illustrate constituent components in greater detail. Frame 210 is of one-piece construction, and may be formed of a suitable metal material such as steel tubing. In an example, a plurality of steel tubing pieces can be connected together by welding, for example, to form frame 210. Frame 210 includes an upper frame end 211 for connection to the front wheel fork 207. A top frame rail 212 and a pair of spaced, bottom frame rails 214 extend back from the upper frame end 211 for supporting an engine and transmission (not shown).

The top frame rail 212 extends back to a junction where it splits into a pair of upper rail legs 213; these rail legs 213 at the junction provide the support for the driver seat and driver. The rail legs 213 extend outward as shown in FIG. 3 and then are oriented so as to be parallel to each other in the same plane. A vertical center bar 218, a series of cross bars 216 between the bottom frame rails 214, and a cross bar 217 between the upper rail legs 213 provide structural strength for frame 210. The spaced bottom frame rails 214 terminate beneath and in contact with ends of the upper rail legs 213 so as to form the arms 215 that extend rearward to accommodate a modular structure such as wheelchair 300.

Figure 4:
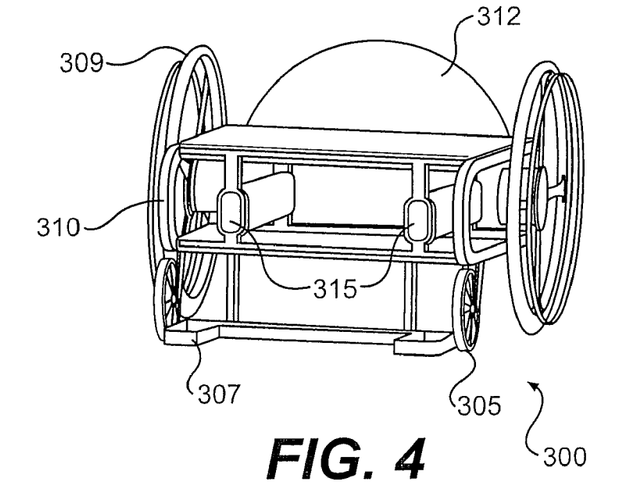
FIG. 4 is a perspective view of the wheelchair of FIG. 1.

FIG. 4 is a front view of the wheelchair to illustrate constituent components in greater detail. Wheelchair 300 includes a frame 310 supporting a seat 312. A pair of mounting rails 315 is disposed beneath a seating surface of seat 312. The wheelchair 300 includes a pair of small front wheels 305 and larger rear wheels 309, as well as foot rests 307 which are attached to frame 310. Wheelchair 300 is specifically configured to lock onto the vehicle frame 210 and is fully functional when not locked to frame 210.

Figure 5:
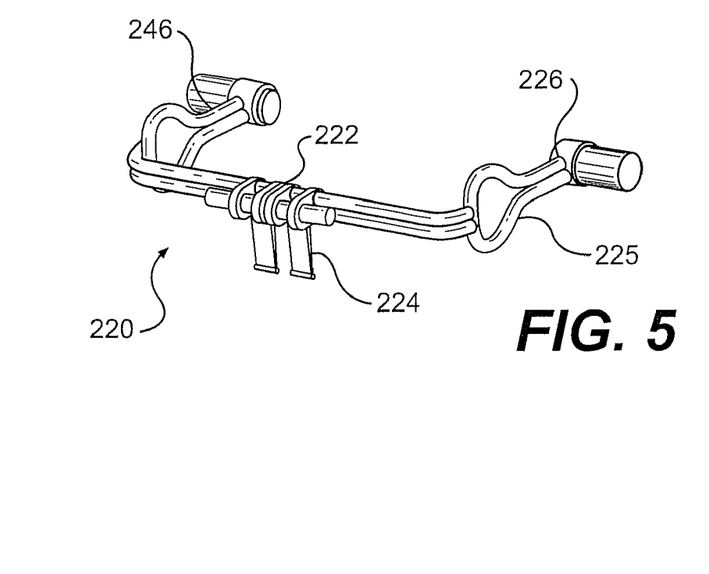
FIG. 5 is a perspective view of a swing arm assembly of the vehicle of FIG. 1.
Figure 6:
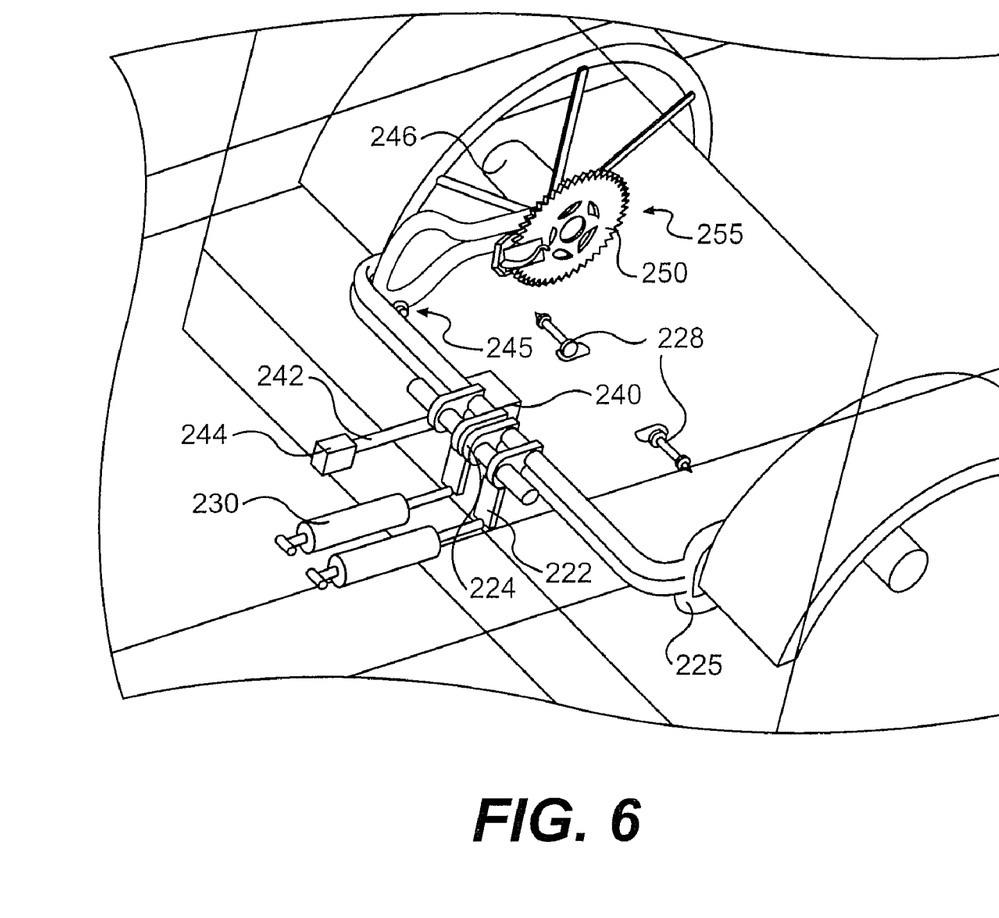
FIG. 6 is a perspective view of the swing arm assembly and drive assembly of the vehicle of FIG. 1.

FIG. 5 is a front view of the swing arm assembly, and FIG. 6 is a partial perspective view of the swing arm assembly. Combined with the dual adjustable air pistons driven by an onboard air compressor (not shown), the swing arms 225 provide independent suspension and allow the motorcycle 200 to be lowered to the ground for coupling with the wheelchair 300, as described above. Unlike traditional double-sided swing arms which bracket both sides of the rear wheel 209, the swing arms 225 are single-sided and turned in the direction opposite than that of the traditional swing arm to provide the opening at the trike 200 rear end. Accordingly, the swing arm orientation provides an open rear end so that trike 200 can accommodate a modular structure such as wheelchair 300.

As shown, each swing arm 225 is connected to a central brace 222 at one end and terminates in a collar 226 which encircles rear wheel axle 246. A pair of bracket arms 224 extend downward from the central brace 222 and are connected to the pistons 242 so that the rear of frame 210 can be raised and lowered as previously described.

FIG. 6 also shows part of the shaft drive 240 that is combined with chain drive 250 via the wheel chain (not shown). The shaft drive 240 includes a shaft 242 having a connector 244 at an end thereof for connection the upstream transmission system of trike 200. FIG. 6 further illustrates an independent brake system 260 that is attached to the chain drive 250; each rear wheel 209 has a brake system 260.

Figure 7:
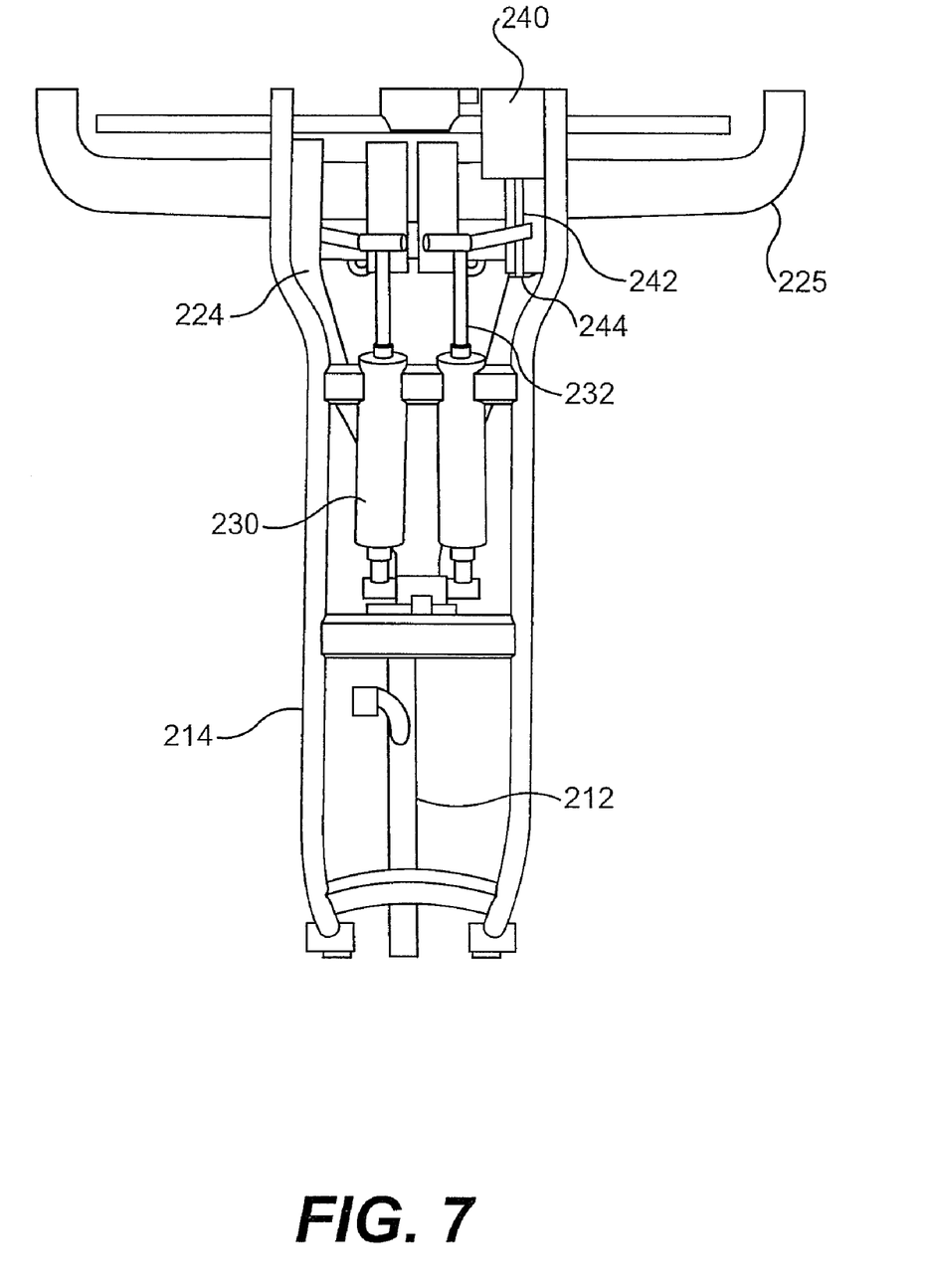
FIG. 7 is a bottom plan view part of the bottom of the vehicle of FIG. 1.

FIG. 7 is a partial bottom view of the swing arm assembly, vehicle frame, shaft drive and dual piston system to show interconnected components in further detail. FIG. 7 more clearly shows the connection of the dual piston system 230 to cross bar 216 between bottom frame rails 214 and also illustrates the connection of the pistons 232 to bracket arms 224 of the swing arm assembly 200. FIG. 7 further shows the shaft drive 240 relation to the swing arm assembly 225 (absent shaft drive sprockets 245).

Figure 8:
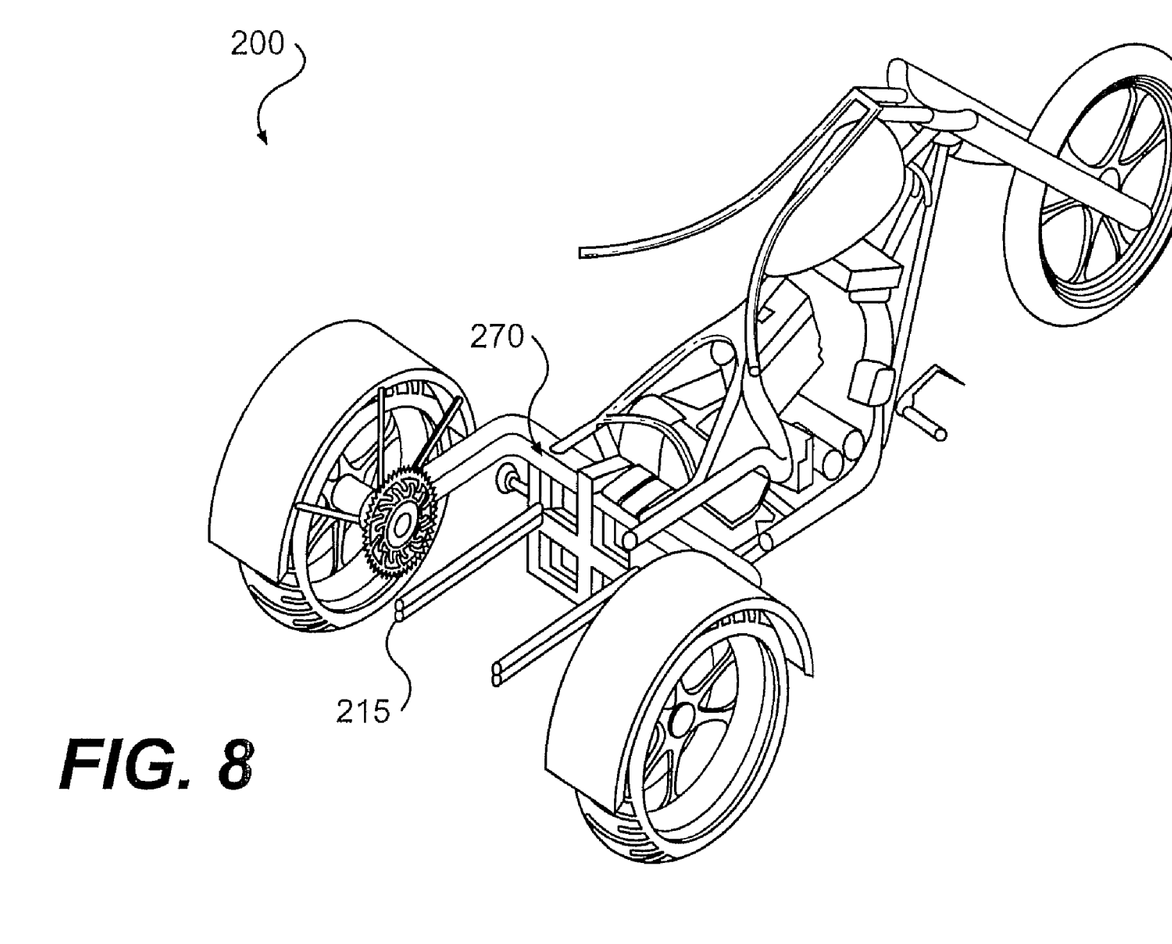
FIG. 8 is a perspective view of a three-wheeled vehicle having a frame with an integral lift assembly in accordance with another embodiment of the present invention.

FIG. 8 is a perspective view of a three-wheeled vehicle having a frame with an integral lift assembly in accordance with another example embodiment. Trike 200 in FIG. 8 is the same as shown in FIGS. 1 and 13, with the exception of a modified frame 210 rear end to include a lift assembly 270 having the pair of arms 215 attached thereto.

Figure 9A:
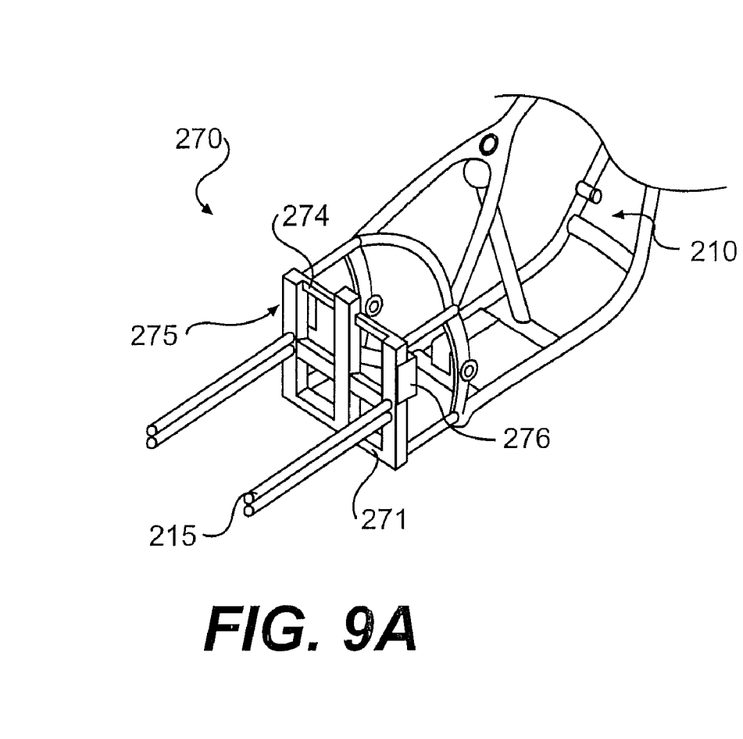
FIG. 9A is a rear perspective view of the lift assembly of FIG. 8 in a raised position.
Figure 9B:
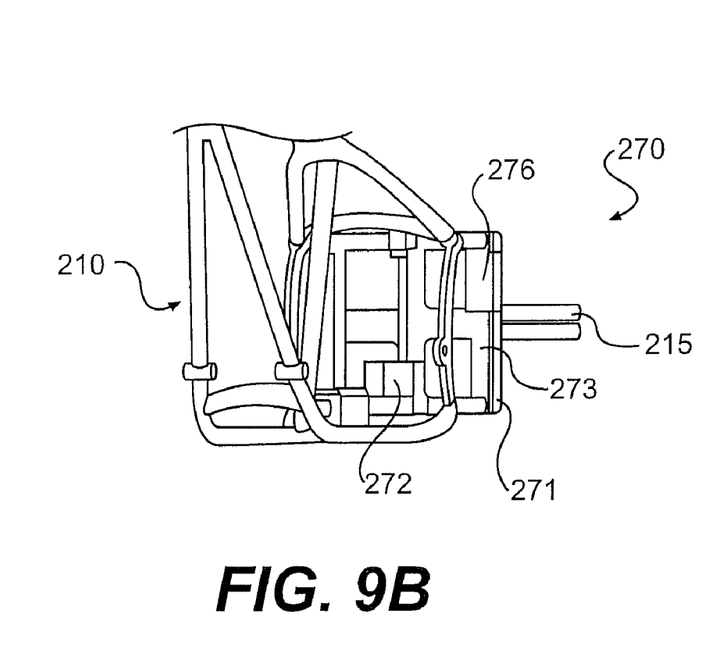
FIG. 9B is a front perspective view of lift assembly of FIG. 8.
Figure 10:
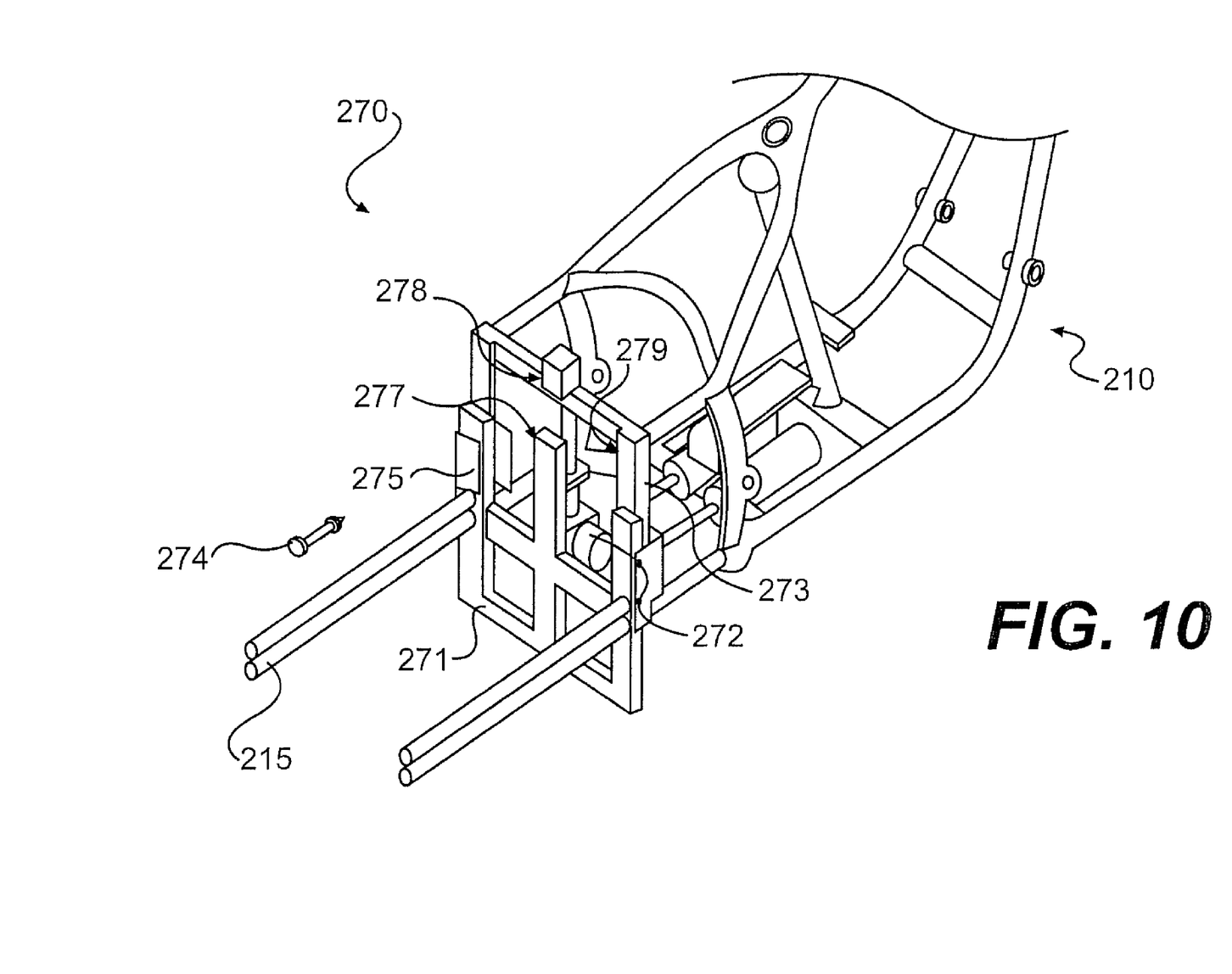
FIG. 10 is a rear perspective view of the lift assembly of FIG. 8 in a lowered position.

FIGS. 9A and 9B illustrate components of the integral lift assembly in its raised position in more detail, and FIG. 10 is a partial rear perspective view of the frame to show features of the integral lift assembly in its lowered position in more detail. Referring to FIGS. 9A, 9B and 10, the lift assembly 270 comprises a plate 271 adapted to move up and down vertically via a screw drive 272. Plate 271 includes a pair of collars 276 which keep it in mating relationship with a plate frame 273 that forms part of vehicle frame 210. To facilitate alignment of the plate 271 with plate frame 273, each outer vertical arm 275 of plate 271 has a alignment rib (obscured) which rides in a keyway or channel 279 of the plate frame 273.

For loading the wheelchair 300 on arms 215, a locking pin 274 through aligned holes 278, 279 is removed, and the screw drive 272 is actuated to lower the rear end of the frame 210 so that the arms 215 align with the mounting rails of the wheelchair 300. The rider then wheels the wheelchair 300 forward along the arms 215 until it can no long move forward, and then suitable locking means such as a locking pin, cotter pin or fastener may be used to lock the arms 215 and mounting rails 315 together. The trike driver or the wheelchair rider then actuates the screw drive to raise the frame 210 (and hence plate 271) such that holes 278 and 279 are aligned, and then the locking pin 274 is inserted; the rider is now in the riding position on trike 200.

Figure 11:
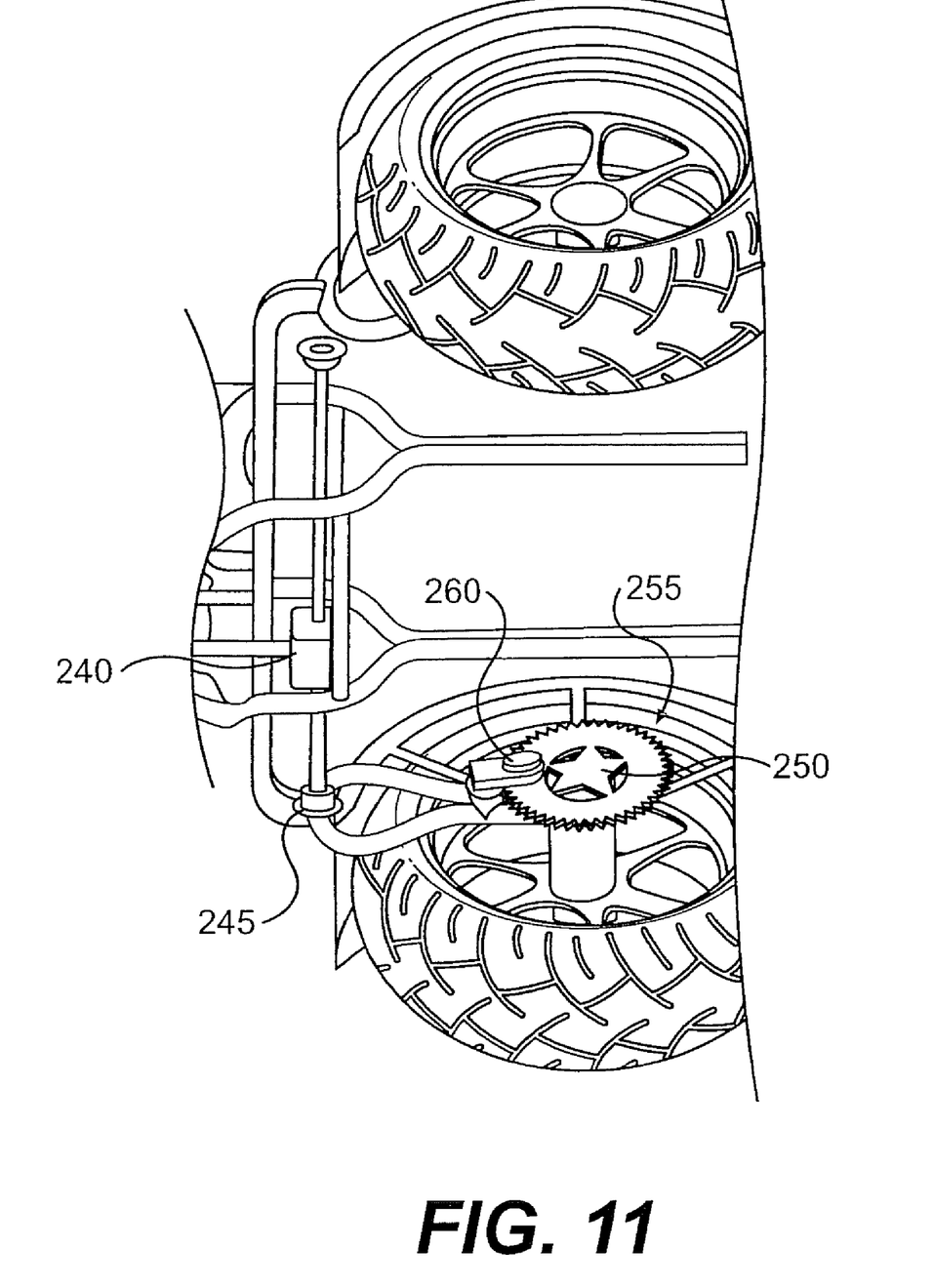
FIG. 11 is a bottom perspective view of the vehicle.

FIG. 11 is a partial bottom view of the vehicle with components removed to illustrates the drivetrain with reverse differential and combined shaft drive and chain drive, in accordance with the example embodiments. In addition to incorporating dual, independent swings arms 225 to facilitate opening up the rear end of trike 200, the trike 200 has a drivetrain in which the transmission is connected via a shaft 242 to a combined shaft drive 240 and chain drive 250. Further, instead of having the conventional single solid axle between the rear wheels, each rear wheel 209 has its independent axle 246 that terminates at the chain drive 250. The chain drive 250 and shaft drive 240 are connected via wheel chains (not shown) between the shaft sprocket 245 and wheel sprocket 255. Thus, the combination of drives 240, 250 form a reverse differential. Each rear wheel 209 can thus be independently powered and have its own dedicated reverse differential.

The custom drivetrain, by combining the shaft drive and chain drive to employ a reverse differential, thus allows for open space behind the driver seat where the rider and wheelchair 300 are located, as opposed to traditional rear ends found in trikes. The integrated wheelchair 300 is specifically configured to lock onto the vehicle frame 210 as previously noted and is fully functional.

Figure 12:
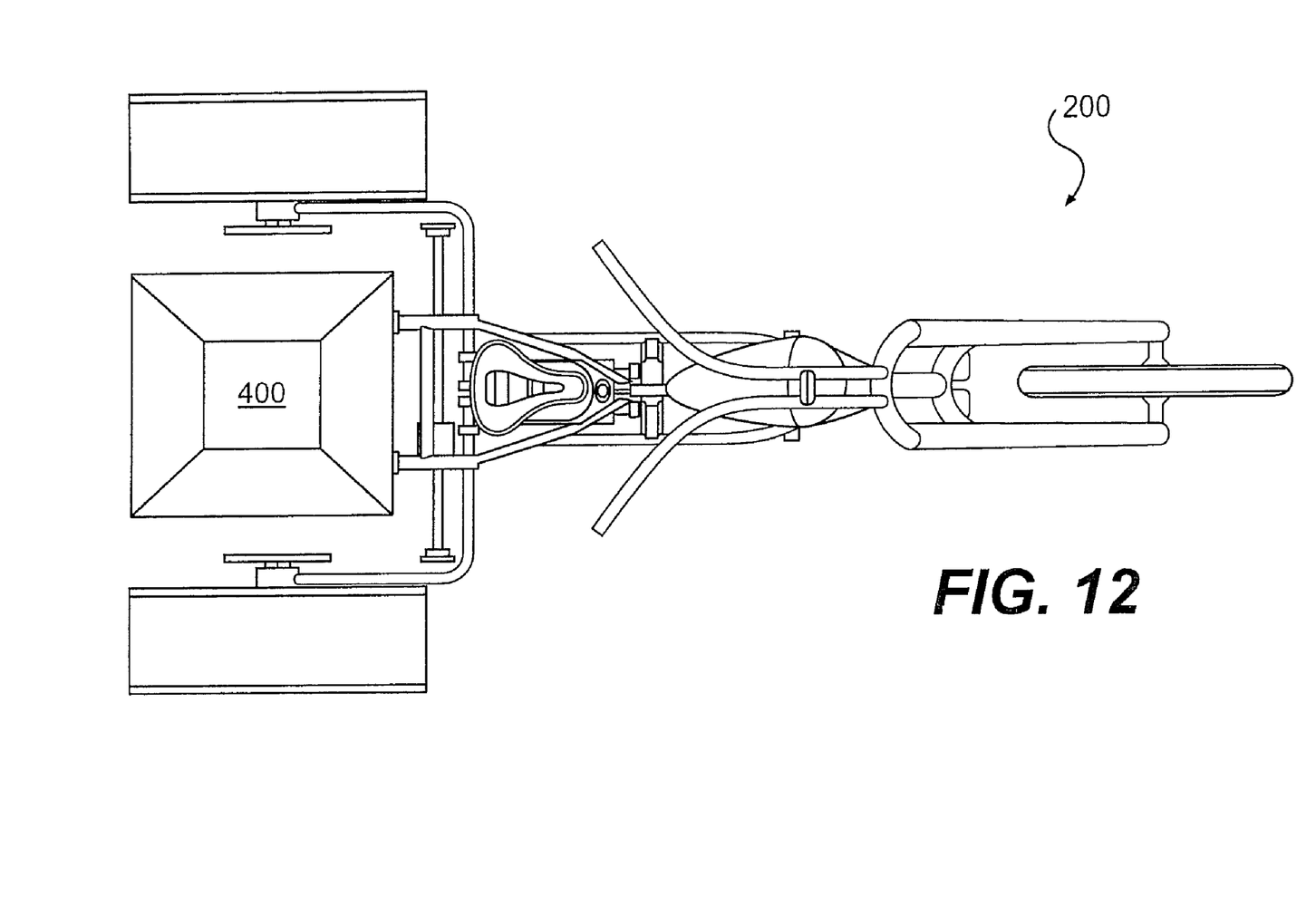
FIG. 12 is a top view of a three-wheeled vehicle carrying a storage container.

FIG. 12 is a top view of a three-wheeled vehicle carrying an integral modular structure in accordance with another example embodiment. FIG. 12 illustrates trike 200 supported a cargo container 400 behind its open rear end. The cargo carrier 400 may be configured with rails similar to mounting rails 315. The frame 210 may be configured with a lifting system comprised of the dual piston system 230 as shown in FIG. 7 for example, or the lifting assembly 270 as shown in FIGS. 9A, 9B and 10. Alternatively or in addition to being configured to carry a cargo container 400, the trike 200 may also integrate other modular structures, such as luggage rack which may optionally include a seat, a standalone secondary seat, side car or other modular structure.

The example embodiments may allow a person that is in a wheelchair an opportunity to ride in style and comfort. The rider will not have to get out of the wheelchair and onto the bike seat. The rider will not have to worry about having someone transport their wheelchair because they cannot carry it on the bike. The rider will not require any assistance to mount, operate, or dismount the bike. The rider thus gains independence and is free to go where and when they want without help.

The example embodiments being thus described, it will be obvious that the same may be varied in many ways. Such variations are not to be regarded as a departure from the embodiments of the present invention. All such modifications as would be obvious to one skilled in the art are intended to be included within the following claims.

What is claimed is:

1. A motorized vehicle comprising:
 a frame having a front end connected to at least one front wheel and having a rear end;
 first and second spaced swing arm assemblies mounted at the rear end;
 first and second rear wheel assemblies supported by said first and second swing arm assemblies and defining a space therebetween;
 at least one support extending from said frame into said space, and
 a driver's seat mounted to said frame at a location between said at least one support and an end of said at least one front wheel;
 wherein said at least one support is mounted to a plate slidably mounted on the frame and including a drive for moving the plate relative to the frame.

2. The motorized vehicle of claim 1 wherein said vehicle includes a motor, a drive shaft turned by said motor, a transverse shaft operatively connected to said drive shaft and first and second gears at first and second spaced ends of said transverse shaft, wherein said first and second wheel assemblies each include a drive gear, and including first and second chains connecting said first and second transverse shaft gears to said first and second drive gears.

3. The motorized vehicle of claim 1 wherein said vehicle includes a motor, a drive shaft turned by said motor and a transverse shaft having first and second ends operatively connected to said drive shaft, said first and second ends of said transverse shaft being coupled to said first and second wheel assemblies, whereby rotary movement of said first and second transverse shaft ends is transmitted to said first and second wheel assemblies.

4. The motorized vehicle of claim 1, further including a modular structure releasably mounted to said at least one support.

5. The motorized vehicle of claim 4 wherein said modular structure is selected from the group consisting of a wheelchair, a cargo carrier and a secondary seat.

6. The motorized vehicle of claim 1 including a wheelchair releasably mounted to said at least one support.

7. The motorized vehicle of claim 1 wherein said at least one front wheel comprises a single front wheel.

8. The motorized vehicle of claim 1 wherein said at least one support comprises first and second rods projecting from said plate and a modular structure releasably mounted to said at least one support, said modular structure including first and second spaced receivers receiving said first and second projecting rods.

9. The motorized vehicle of claim 8, wherein said plate is movable between a first position and a second position relative to said frame and wherein said first and second rods are configured to raise said modular structure off the ground when said plate is moved from said first position to said second position.

10. The motorized vehicle of claim 9 wherein said modular structure comprises a wheelchair.

11. A motorized vehicle comprising:
- a frame having a front end connected to at least one front wheel, and having a rear end;
- a driver's seat mounted on said frame;
- a steering mechanism for steering said motorized vehicle located on a first side of said driver's seat;
- first and second spaced swing arm assemblies mounted at the rear end;
- first and second rear wheel assemblies supported by said first and second swing arm assemblies and defining a space therebetween;
- a support mounted in said space for movement between a first position and a second position relative to said frame, said support including first and second rods projecting away from said driver's seat; and
- a drive for shifting said support between said first position and said second position;
- wherein the motorized vehicle further includes a wheelchair having first and second receivers and wherein said first and second rods project from said plate into said first and second receivers to releasably connect said wheelchair to said motorized vehicle.

12. The motorized vehicle of claim 11 wherein said first and second rods are located on a second side of said driver's seat opposite from said steering mechanism.

13. The motorized vehicle of claim 12, wherein said at least one front wheel comprises a single front wheel.

14. The motorized vehicle of claim 11 wherein said wheelchair rests on a ground supporting said motorized vehicle when said first and second rods are received in said first and second receivers and said support is in said first position and wherein said wheelchair is suspend above the ground when said first and second rods are received in said first and second receivers and said support is in said second position.

* * * * *